(12) United States Patent
Murphy et al.

(10) Patent No.: US 9,361,945 B2
(45) Date of Patent: Jun. 7, 2016

(54) RETAINING CLIP FOR USE WITH A MASS STORAGE DEVICE

(71) Applicant: Sanmina Corporation, San Jose, CA (US)

(72) Inventors: Kent Thomas Murphy, Colorado Springs, CO (US); Christopher Anthony Pollard, Monument, CO (US); Eric Edgar Wermel, Colorado Springs, CO (US)

(73) Assignee: SANMINA CORPORATION, San Jose, CA (US)

( * ) Notice: Subject to any disclaimer, the term of this patent is extended or adjusted under 35 U.S.C. 154(b) by 0 days.

(21) Appl. No.: 14/601,811

(22) Filed: Jan. 21, 2015

(65) Prior Publication Data

US 2015/0208542 A1   Jul. 23, 2015

Related U.S. Application Data

(60) Provisional application No. 61/929,508, filed on Jan. 21, 2014.

(51) Int. Cl.
| | |
|---|---|
| *G06F 1/16* | (2006.01) |
| *G11B 33/00* | (2006.01) |
| *G06F 1/18* | (2006.01) |
| *G11B 25/04* | (2006.01) |
| *G11B 33/12* | (2006.01) |

(52) U.S. Cl.
CPC .............. *G11B 33/00* (2013.01); *G06F 1/187* (2013.01); *G11B 25/043* (2013.01); *G11B 33/122* (2013.01); *Y10T 29/49117* (2015.01)

(58) Field of Classification Search
USPC .............. 206/486, 460, 308.1, 309, 349, 763, 206/561; 361/679.46, 679.31, 679.33, 361/679.58, 679.3, 679.56, 679.47, 679.26, 361/679.32, 679.01, 679.08, 679.34, 361/679.21, 679.02; 455/573, 575.8, 575.5, 455/509, 557; 312/108, 107, 408, 111, 312/265.5, 236; 248/74.1, 74.2, 625, 451, 248/460, 205.9, 452, 309.1, 454, 456, 248/206.2, 206.5
See application file for complete search history.

(56) References Cited

U.S. PATENT DOCUMENTS

| 8,647,191 B2 * | 2/2014 | Shayesteh | ............ G07D 7/0093 463/25 |
|---|---|---|---|
| 2010/0085703 A1 * | 4/2010 | Duke | ................... H05K 7/1495 361/679.58 |
| 2013/0027862 A1 * | 1/2013 | Rayner | ................. G06F 1/1656 361/679.3 |

* cited by examiner

*Primary Examiner* — Hung Duong
(74) *Attorney, Agent, or Firm* — Loza & Loza, LLP; Heidi Eisenhut

(57) ABSTRACT

A retaining clip to be used with a storage device in a host computer system, wherein the retaining clip is configured to secure an interposer serving as electrical and logic state interface between the device and the structure of the host system. The retaining clip engages with the device through a peg inserted into a mounting hole for the device and secures the interposer by holding it against the device's data or power connector by a tab extending over the interposer and exerting pressure against it towards the device. Additional fins extending from the body of the clip in substantially opposite direction from the tab secure the tab against the enclosure of the host computer system.

20 Claims, 9 Drawing Sheets

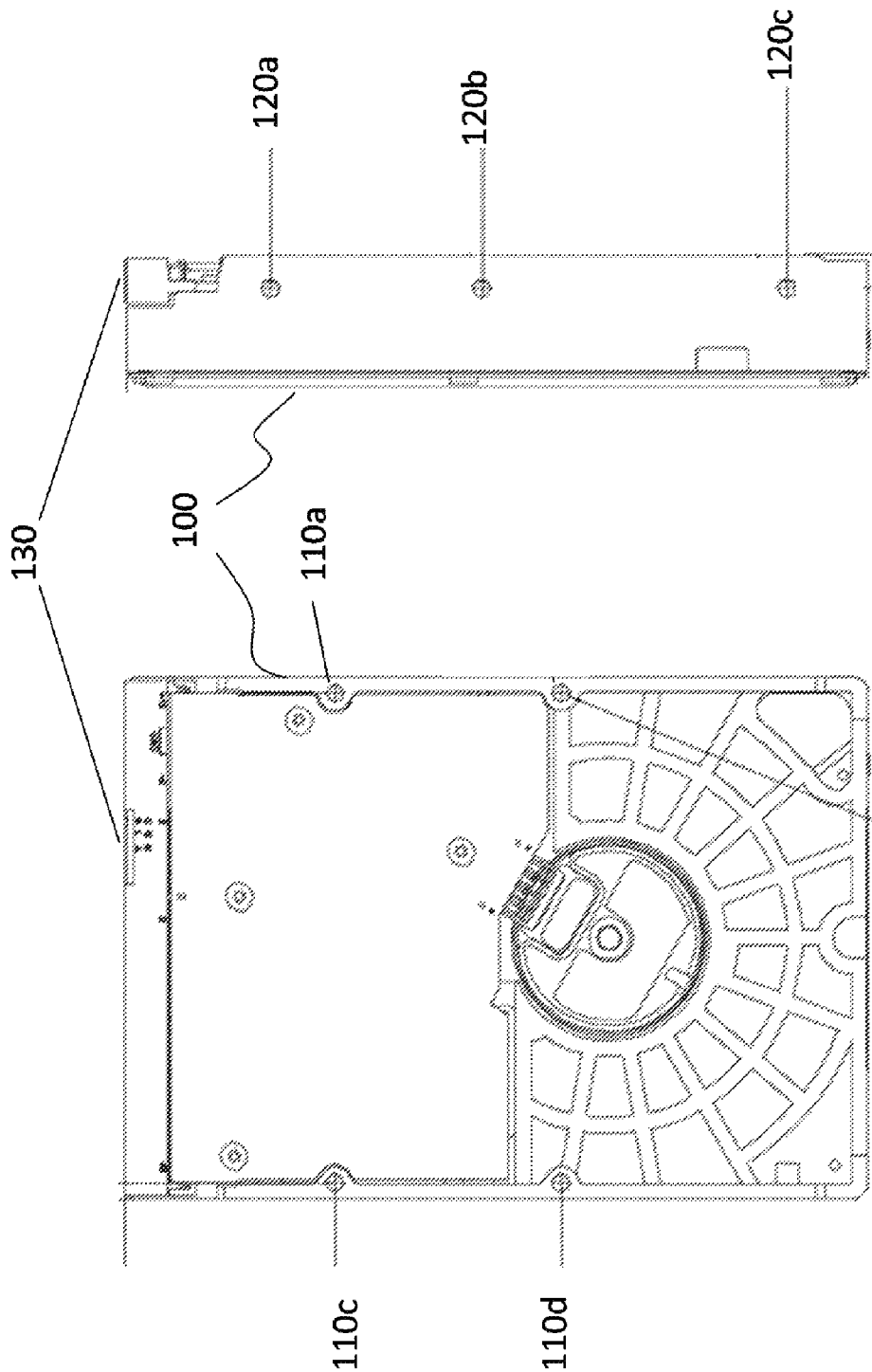

RETAINING CLIP FOR USE WITH A MASS STORAGE DEVICE

CLAIM OF PRIORITY UNDER 35 U.S.C. §119

The present application for patent claims priority to U.S. Provisional Application No. 61/929,508 entitled "RETAINING CLIP FOR USE WITH A MASS STORAGE DEVICE", filed Jan. 21, 2014, assigned to the assignee hereof and hereby expressly incorporated by reference herein.

FIELD

The present invention generally relates to memory devices to be used with computers and other processing apparatuses. More particularly, this invention relates to Serial ATA (Advance Technology Attachment; SATA) or Serially Attached SCSI (SAS) computer hard disk drives and their interfacing with system logic.

BACKGROUND OF THE INVENTION

Hard disk drives (HDDs) using rotatable media are a low-cost and robust solution for permanent storage of data. Current generations of HDD exist in different form factors, with the 2.5" form factor prevailing in the mobile sector and the 3.5" form factor being the most common solution in desktop, server and workstation environments. The system interface of either of the above may conform to the Serial ATA (SATA) or the Serially Attached SCSI (SAS) standard with the first being prevalent in the consumer market segment and the latter more commonly used in the enterprise market segment.

From a cost perspective, in some cases, it is advantageous to use consumer-grade SATA drives in an enterprise environment, especially in the areas of "cold storage" or archiving of data, where this type of configuration is starting to supersede tape storage as the storage media of choice.

The integration of consumer grade SATA drives into an enterprise environment may require some modifications or adapters in order to accommodate some advanced features like staggered spin-up across an array, which is necessary in order to avoid peak current load. In addition, SATA uses a point to point protocol that relies on a single connection between a host bus adapter and the drive whereas enterprise class SAS drives are dual-ported for host failover. A relatively easy way for implementing any of the aforementioned features relies on the use of an interposer, that is, a board having a female SATA-compatible connector on one side and a male connector conforming to the respective host configuration on the opposing side.

Interposers, as described above, are engaging directly with the SATA power and signal connector assembly on the HDD (or solid state drive). These connectors are configured for low insertion force, meaning easy plug and un-plug of the mating connectors. However, this can pose a problem with respect to unwanted disengaging of the interposer from the drive. Alternatively, the interposer can be configured with a locking mechanism that mechanically engages with the SATA connector on the HDD. In this case, however, any mechanical stress from the interposer or else the cable is directly transferred to the connector, which is typically soldered to the printed circuit board on the drive. This often results in physical damage to the drive upon unplugging of the interposer or the cable.

The above-discussed clearly illustrates that there is a need for a better solution that provides secure connection between an interposer and the enclosure of a HDD while providing strain relief for all electrical connections and circuit boards.

SUMMARY

The following presents a simplified summary of one or more implementations in order to provide a basic understanding of some implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

According to one aspect, a retaining clip for securing an interposer to a first surface of a mass storage device with a mass storage device is provided. The retaining clip comprises a planar body in alignment with a second surface of the mass storage device, the second surface having a plurality of mounting holes for the device; a first peg protruding from the planar body, the first peg configured for insertion into a first mounting hole of the plurality of mounting holes, and defining a position of the planar body relative to the mass storage device; and a first tab extending perpendicularly downward from the planar body and configured to overlap with a carrier board of the interposer, where a proximal surface of the first tab apposing the device is located at a distance from the first surface of the device when the first peg is inserted into the first mounting hole.

The retaining clip may further comprise a second peg extending perpendicularly downward from the planar body and configured for insertion into a second mounting hole of the plurality of mounting holes.

The planar body of the retaining clip may include a first member including a first end and an opposing second end; a second member including a third end and a fourth end, wherein the third end of the second member is integrally connected to the second end of the first member; and a third member including a fifth end and an opposing sixth end, wherein the fifth end of the third member is integrally connected to the fourth end of the second member, and wherein the third member located in a same vertical plane as a side edge of the mass storage device; and wherein the second peg extends perpendicularly downward from where the second end of the first member integrally connects with the third end of the second member.

The retaining clip may further comprise a second tab located in the same plane as the first tab. The retaining clip may also comprise a first fin extending perpendicularly upward from the first end of the first member in an opposite direction of the first peg; a second fin extending perpendicularly upward from where the second end of the first member and the third end of the second member integrally connect, in the substantially opposite direction of the first tab; and a third fin extending perpendicularly upward from where the fourth end of the second member and the fifth end of the third member integrally connect in the substantially opposite direction of the first tab. The first, second and third fins appose a structure of a host system connected to the mass storage device and press down on the retaining clip against the mass storage device preventing the first and second pegs from disengaging from the first and second mounting holes.

The first tab may include a notch member having a U-shape and comprising a first wall and a second wall separated by an upper wall forming a channel adapted to receive a cable. The first tab may further include a tab peg, extending perpendicularly outward from a first wall and parallel to the planar body, for insertion into an interposer mounting hole located on a back surface of the interposer.

Alternatively, the planar body may comprise a base member having a first base end and an opposing second base end, a first arm integrally connected to and extending perpendicularly outward from the base member, and a second arm integrally connected to and extending perpendicularly out from a center portion of the base member.

The base member may further include a first lateral tab extending perpendicularly downward from the first base end of the base member and a second lateral tab extending perpendicularly downward from the second base end of the base member. The first and second lateral tabs may include pegs extending perpendicularly outward and adapted to be received into the plurality of mounting holes.

According to another aspect, an apparatus is provided. The apparatus comprises a mass storage device with a host interface connector and a first cable to connect the host interface connector of the mass storage device to a structure of a host system; an interposer inserted between the mass storage device and the first cable, the interposer including: a carrier board including a distal surface of the carrier board positioned at a distance from a first surface of the mass storage device; and a first connector to connect with the host interface connector of the mass storage device and a second connector to connect with the first cable; a retaining clip for securing the interposer to the mass storage device, the retaining clip including: a planar body in alignment with a second surface of the mass storage device, the second surface having a plurality of mounting holes for the device; a first peg protruding from the planar body, the first peg configured for insertion into a first mounting hole of the plurality of mounting holes, and defining a position of the planar body relative to the mass storage device; and a first tab extending perpendicularly downward from the planar body and configured to overlap with the carrier board of the interposer, where a proximal surface of the first tab apposing the device is located at a distance from the first surface of the device when the first peg is inserted into the first mounting hole.

The retaining clip of the apparatus may further include a second peg extending perpendicularly downward from the planar body and configured for insertion into a second mounting hole of the plurality of mounting holes.

The planar body of the apparatus may include a first member including a first end and an opposing second end; a second member including a third end and a fourth end, wherein the third end of the second member is integrally connected to the second end of the first member; and a third member including a fifth end and an opposing sixth end, wherein the fifth end of the third member is integrally connected to the fourth end of the second member, and wherein the third member located in a same vertical plane as a side edge of the mass storage device; and wherein the second peg extends perpendicularly downward from where the second end of the first member integrally connects with the third end of the second member.

The retaining clip of the apparatus may further comprise a first fin extending perpendicularly upward from the first end of the first member in an opposite direction of the first peg; a second fin extending perpendicularly upward from where the second end of the first member and the third end of the second member integrally connect, in the substantially opposite direction of the first tab; and a third fin extending perpendicularly upward from where the fourth end of the second member and the fifth end of the third member integrally connect in the substantially opposite direction of the first tab. The first, second and third fins appose a structure of a host system connected to the mass storage device and press down on the retaining clip against the mass storage device preventing the first and second pegs from disengaging from the first and second mounting holes.

The planar body of the apparatus may further comprises a base member having a first base end and an opposing second base end, a first arm integrally connected to and extending perpendicularly outward from the base member, and a second arm integrally connected to and extending perpendicularly out from a center portion of the base member; and wherein the base member includes a first lateral tab extending perpendicularly downward from the first base end of the base member and a second lateral tab extending perpendicularly downward from the second base end of the base member.

According to yet another aspect, a method for securing an interposer assembly with a mass storage device, the interposer including a carrier board, a first connector configured to mate with a signal and power connector assembly of the mass storage device and the second connector configured to mate with a cable assembly providing signals and power from a host computer is provided. The method comprises mating the interposer with the device, attaching a retaining clip to the device and interposer, the retaining clip including: a planar body in alignment with a second surface of the mass storage device, the second surface having a plurality of mounting holes for the device; a first peg protruding from the planar body, the first peg configured to be inserted into a first mounting hole of the plurality of mounting holes, and defining a position of the planar body relative to the mass storage device; and a first tab extending perpendicularly downward from the planar body and configured to overlap with the carrier board of the interposer, where a proximal surface of the first tab apposing the device is located at a distance from the first surface of the device when the first peg is inserted into the first mounting hole.

BRIEF DESCRIPTION OF THE DRAWINGS

FIG. 1a shows a bottom view of a hard disk drive (HDD) having bottom mounting holes located on the bottom surface of the HDD.

FIG. 1b shows a side view of a hard disk drive (HDD) having side mounting holes located on the bottom surface of the HDD.

DETAILED DESCRIPTION OF THE INVENTION

Figure 2A:
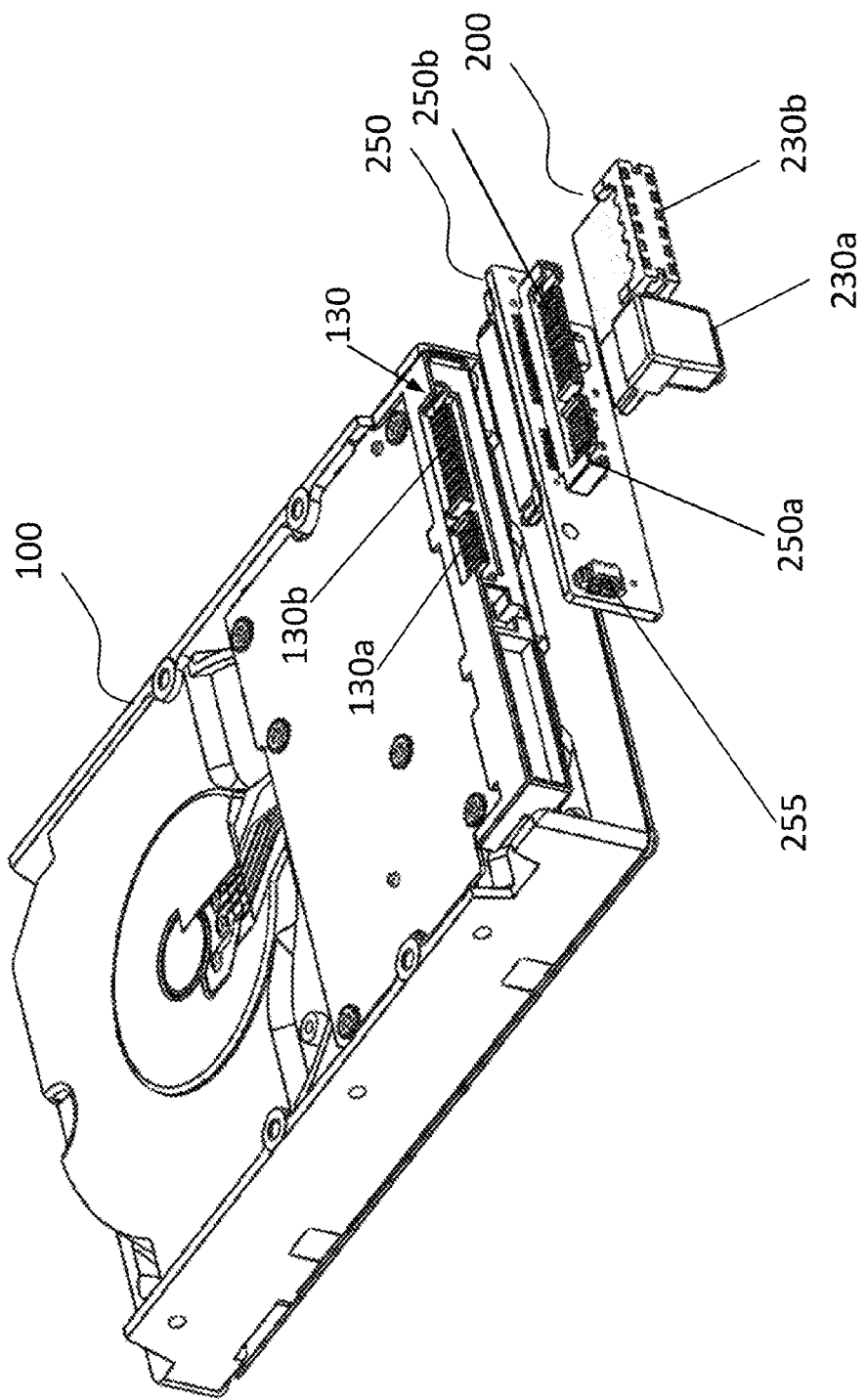
FIG. 2a shows a perspective view of a HDD having an interposer and cable harness in a disassembled configuration.

In the following detailed description of the invention, numerous specific details are set forth in order to provide a thorough understanding of the invention. However, the invention may be practiced without these specific details. In other instances, well known methods, procedures, and/or components have not been described in detail so as not to unnecessarily obscure aspects of the invention.

In the following description, certain terminology is used to describe certain features of one or more embodiments. The term "mass storage device" may refer to a hard disk drive (HDD), a solid state drive or any type of drive for storing data. The term "hole" may refer to any opening through a structure and/or component or a hollowed-out place in a structure and/or component, including apertures, bores, cavities, chambers, grooves, notches, passages, slits and slots.

Overview

One feature pertains to a strain-relief retaining clip for an interposer to be used with a hard disk drive (HDD). That is, a retaining clip for securing an interposer to a mass storage device used in a computer host system is provided. The mass storage device may include a host interface connector that uses a cable to connect the host interface connector to the structure of the host system. An interposer may be inserted between the mass storage device and the cable, wherein the interposer has a carrier board, a first connector to connect with the host interface connector of the mass storage device and a second connector to connect with the cable. When the interposer is secured to the mass storage device, such as a HDD, the interposer is typically not flush with the mass storage device but positioned at a distance from the mass storage device. Consequently, the distal surface of the carrier board is at a distance from the surface of the mass storage device featuring the connector.

The retaining clip may include a planar body for alignment with the bottom surface of the mass storage device, wherein the bottom surface has mounting holes for the device. The retaining clip engages with a mounting screw hole at the bottom surface of a hard disk drive. The mounting holes of hard disk drives conforming to the 3.5" form factor standard or else to the 2.5" form factor standard are precisely defined. The governing document from the Small Form Factor (SFF) committee for 3.5-inch screw mount requirements is defined in SFF-8300. The detailed locations for OEM bottom mount holes, including the addition of alternative bottom mount locations, are defined in SFF-8301 rev 1.6. An overview of the geometry definitions is given in "WD® 3.5-inch Form Factor Mounting and Screw Locations and Depths" (http://www-.wdc.com/wdproducts/library/other/2579-771970.pdf) Although the present invention is described primarily with respect to 2.5" and 3.5" drives, these is by way of example only and the present invention may be applied and adapted to drives of smaller or larger sizes.

The retaining clip may further include a peg protruding from the planar body and configured to be inserted into one of the mounting holes of the device, therefore, when the peg is inserted into the corresponding mounting hole, it defines a spatial relation or position of the clip relative to the device. Additionally, a tab extending from the planar body in a substantially right angle such that it's proximal surface, i.e. the surface facing the mass storage device, may be positioned at the same distance from the device's surface having the system interface connector as the distal surface of the interposer and, furthermore, overlaps with the interposer, preferentially with its carrier board and apposes or is in contact with the interposer.

FIGS. 1a and 1b show bottom and side views, respectively, of a hard disk drive (HDD) 100 with four bottom mounting holes 110a, 110b, 110c, 110d at the bottom surface of the HDD 100 and side mounting holes 120a, b, c at the left lateral side of the HDD 100. The HDD 100 may further include a system interface 130 for interfacing the HDD 100 to the system. The same form factor enclosure may also be used for housing solid state drives using NAND flash or other non-volatile memory technologies as phase-change memory (PCM), resistive random access memory (RRAM) or magnetic random access memory technology as non-limiting examples.

Figure 2B:
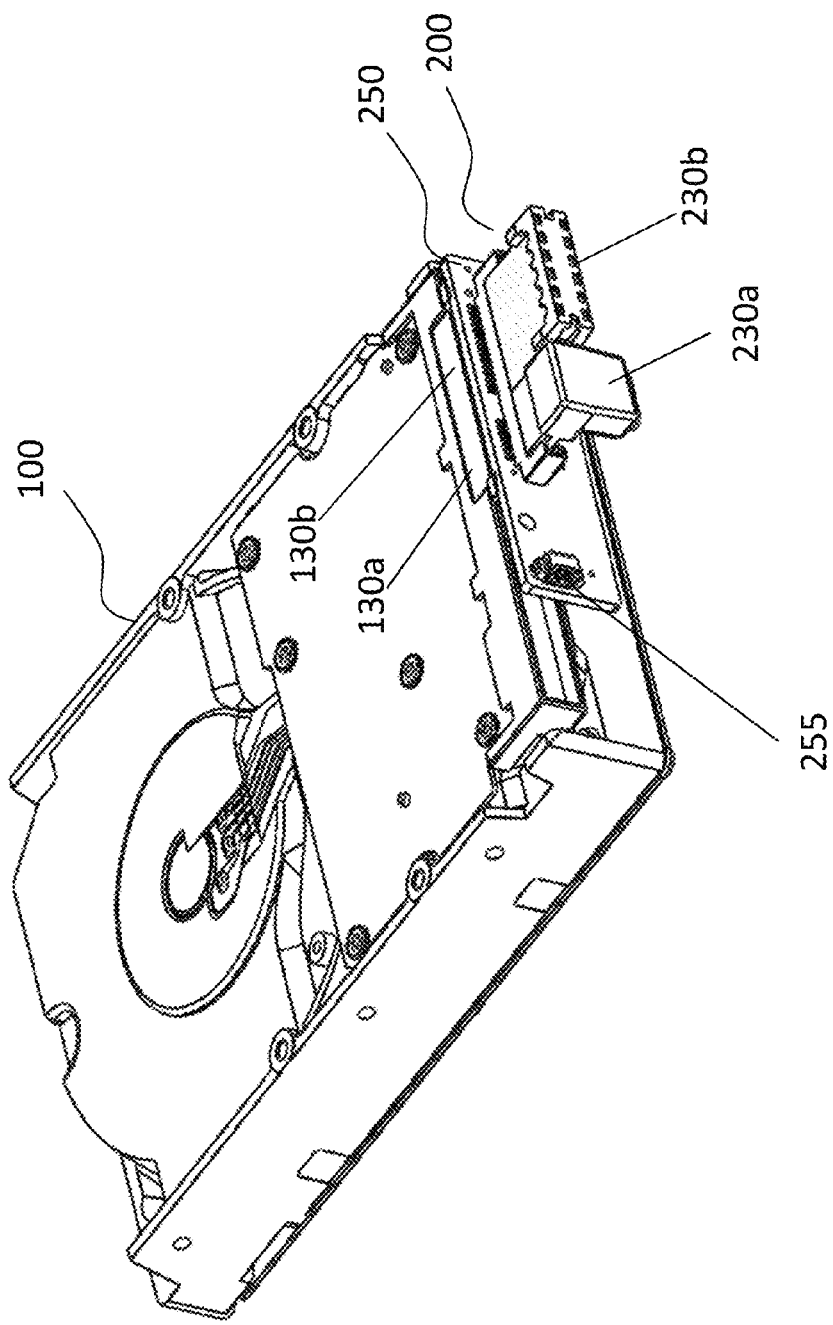
FIG. 2b shows the HDD of FIG. 2a in an assembled configuration.

FIG. 2a shows a perspective view of a HDD 100 having an interposer 250 and cable harness 200 in a disassembled configuration. FIG. 2b shows the HDD of FIG. 2a in an assembled configuration.

As can be seen in FIGS. 2a and 2b, the HDD includes a system interface connector 130 having a data connector 130a, adapted for transmitting and receiving data, as well as a power connector 130b for providing power to the HDD 100. The data connector 130a may be configured to connect or mate with a data cable connector 230a and a power supply connector 230b. An interposer 250 may be placed between the system interface connector 130 (having the data connector 130a and the power connector 130b) and the cable harness 200 (having the data cable connector 230a and the power supply connector 230b).

The interposer 250 may replicate the data connector 130a and power connector 130b of the system interface connector 130 as well as the data cable connector 230a and the power supply connector 230b of the cable harness 200. Instead of having pass-through wiring, the interposer 250 also may insert logic into the signal and power path from the structure of the structure of the host system to the HDD 100. Specifically, the interposer 250 may contain logic to control power from the structure of the host system to the HDD 100, for independently kick-starting the HDD 100 or shutting the HDD 100 down during idle periods. Additionally, the interposer 250 may include logic to monitor the I/O activity of the HDD 100 it is attached to. Control and monitoring signals may be communicated to and from the interposer 250 via a control and monitoring port 255 located on the interposer 250.

SATA and SAS connectors are primarily electrical connectors with only moderate mechanical engagement between the two mating components. In other words, the connectors are designed to easily engage or disengage. In the case of an interposer 250 being inserted into the chain of connectors, this may cause a higher risk for inadvertent disconnect of either one of the connections since the number of connections is doubled and, moreover, because mechanical forces on the connection between the interposer 250 and the HDD 100 are greatly increased.

Figure 3:
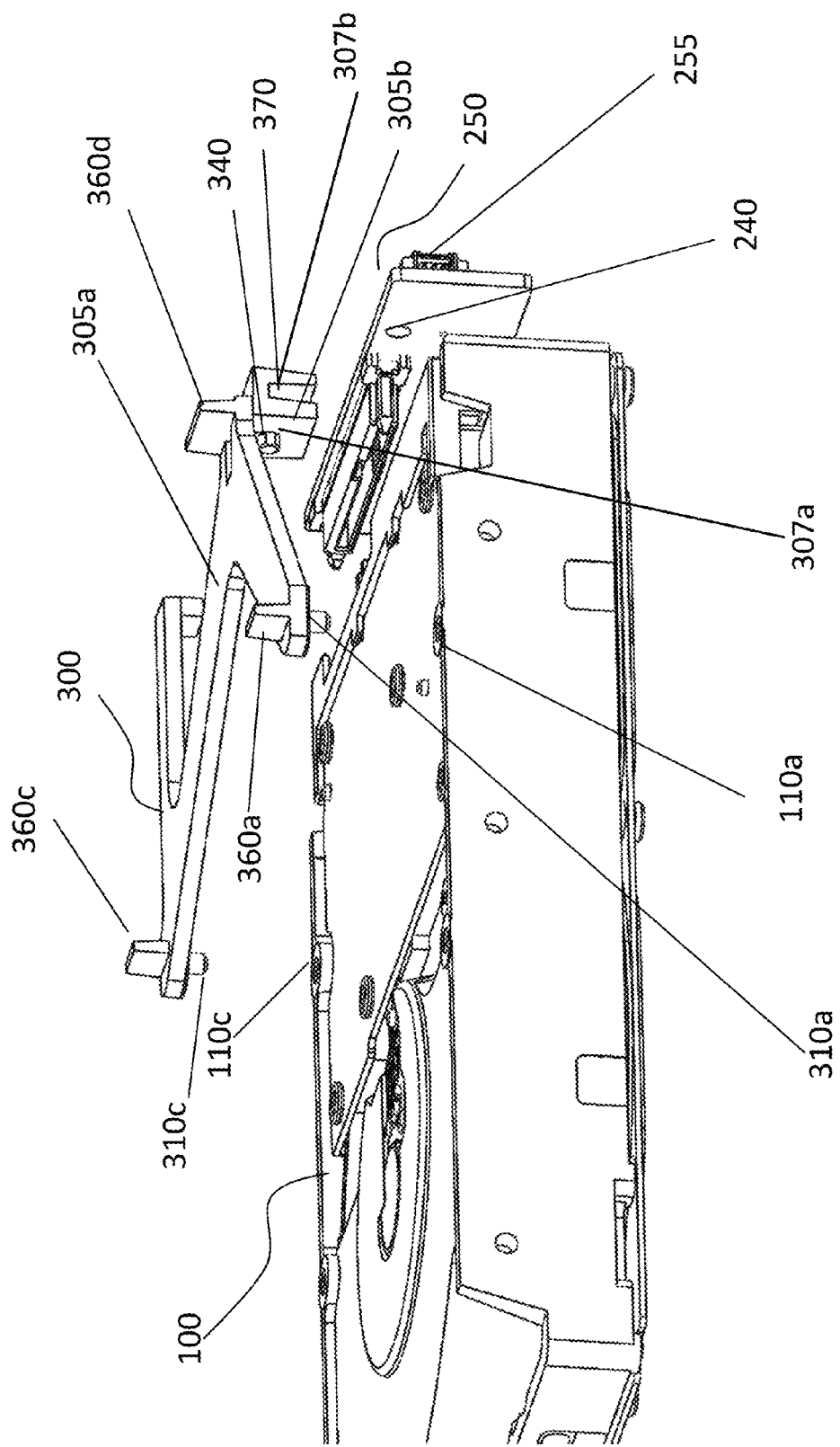
FIG. 3 shows a perspective view of the HDD, interposer and retaining clip in a disassembled configuration.

According to one aspect of the present invention, a retaining clip 300 may be used to secure the interposer 250 to a mass storage device, such as the HDD 100, used in a computer host system. FIG. 3 shows a perspective view of the HDD 100, interposer 250 and retaining clip 300 in a disassembled configuration.

The retaining clip 300 may include a planar body 305a, oriented substantially in parallel to the bottom surface of the HDD 100, and a first tab 305b oriented at a substantially right angle to the planar body 305a. The planar body 305a of the retaining clip 300 may comprise a first member 300a integrally connected to a second member 300b and the second member 300b is integrally connected to a third member 300c.

According to one aspect, the first member 300a may include a first end 300a-1 and an opposing second end 300a-2; the second member 300b may include a third end 300b-1 and an opposing fourth end 300b-2; and the third member 300c may include a fifth end 300c-1 and an opposing sixth end 300c-2. The third end 300b-1 of the second member 300b may be integrally connected to the second end 300a-2 of the first member 300a and the fifth end 300c-1 of the third member 300c may be integrally connected to the fourth end 300b-2 of the second member 300b.

According to one aspect, the mass storage device 100 may have a generally rectangular configuration with a first side edge 100a, a second side edge 100b, a front face 100c and a back face 100d. In one embodiment, the first member 300a may extend upwardly at an angle where it integrally connects with the second member 300b. The second member 300b may then extend downwardly at an angle where it integrally connects with the third member 300c. The third member 300c may be located in a same vertical plane as the second side edge 100b of the mass storage device 100.

The tab first 305b may be located where the second end 300a-2 of the first member 300a and the third end 300b-1 of the second member 300c are integrally connected. The first tab 305b may align with the front face 100c of the drive 100 but be spaced at a distance from the front face 100c of the drive 100 to allow for the insertion of the interposer 250. According to one embodiment, the first tab 305b may include a notch tab 368 having a generally U-shape and including a first wall 368a and a second wall 368b separated by, and integrally connected to, an upper wall 368c forming a guide channel 370 adapted to receive a cable.

The retaining clip 300 may include a first peg 310a, extending perpendicularly downward from where the fourth end 300b-2 of the second member 300b and the fifth end 300c-1 of the third member 300c integrally connect, and be configured to match the position of a mounting hole 110a of the HDD100. According to another aspect of the present invention, a second peg 310c, extending perpendicularly downward from where the fourth end 300b-2 of the second member 300b and the fifth end 300c-1 of the third member 300c integrally connect, may engage with a second mounting hole of the HDD 100.

That is, the first and second pegs 310a and 310c may be inserted into the two mounting holes on the bottom surface of the drive closest to the side of the drive having the system interface connector. The spacing of tab 305b relative to the pegs 310a, 310c may be such that the tab 305b can slide over the distant side of the interposer 250 if the interposer 250 is inserted into the power and data connector assembly of the HDD 100. The tab 305b may be large enough to secure the interposer 250 but small enough not to obstruct data and power connectors 250a, b on located on the interposer 250.

According to another aspect, a tab peg 340 may protrude perpendicularly outward, and parallel to the planar body 305a, from the first wall 307a of the notch 307 of the first tab 305b for insertion into a mounting hole 240, located on the back surface of the interposer 250, to provide vertical support of the interposer 250.

According to another aspect, the retaining clip 300 may include may include first, second and third fins 360a, 360b, 360c extending perpendicularly upward from the planar body 305a. The first fin 360a may extend perpendicularly upward from the first end 300a-1 of the first member 300 of the planar body 305a, away from the drive 100, in the substantially opposite direction of the first peg 310a. The second fin 360c may extend perpendicularly upward from the planar body 305a, where the fourth end 300b-2 of the second member 300b and the fifth member 300c-1 integrally connect, in the substantially opposite direction of the second peg 310c. The third fin 360d may extend perpendicularly upward from the planar body 305a, where the second end 300a-2 of the first member 300a and the third end 300b-1 of the second member 300b integrally connect, in the substantially opposite direction of the first tab 305b.

In a fully assembled configuration, the fins 306a, 360b and 360c may appose the enclosure of the structure of the host system and press down on the retaining clip 300 against the HDD 100, thereby preventing the first and second pegs 310a and 310c from disengaging from the drive mounting holes 110a, 110c. Additionally, as the fins extend towards the wall of the computer enclosure, they prevent the retaining clip 300 from disengaging from the drive 100.

Figure 4A:
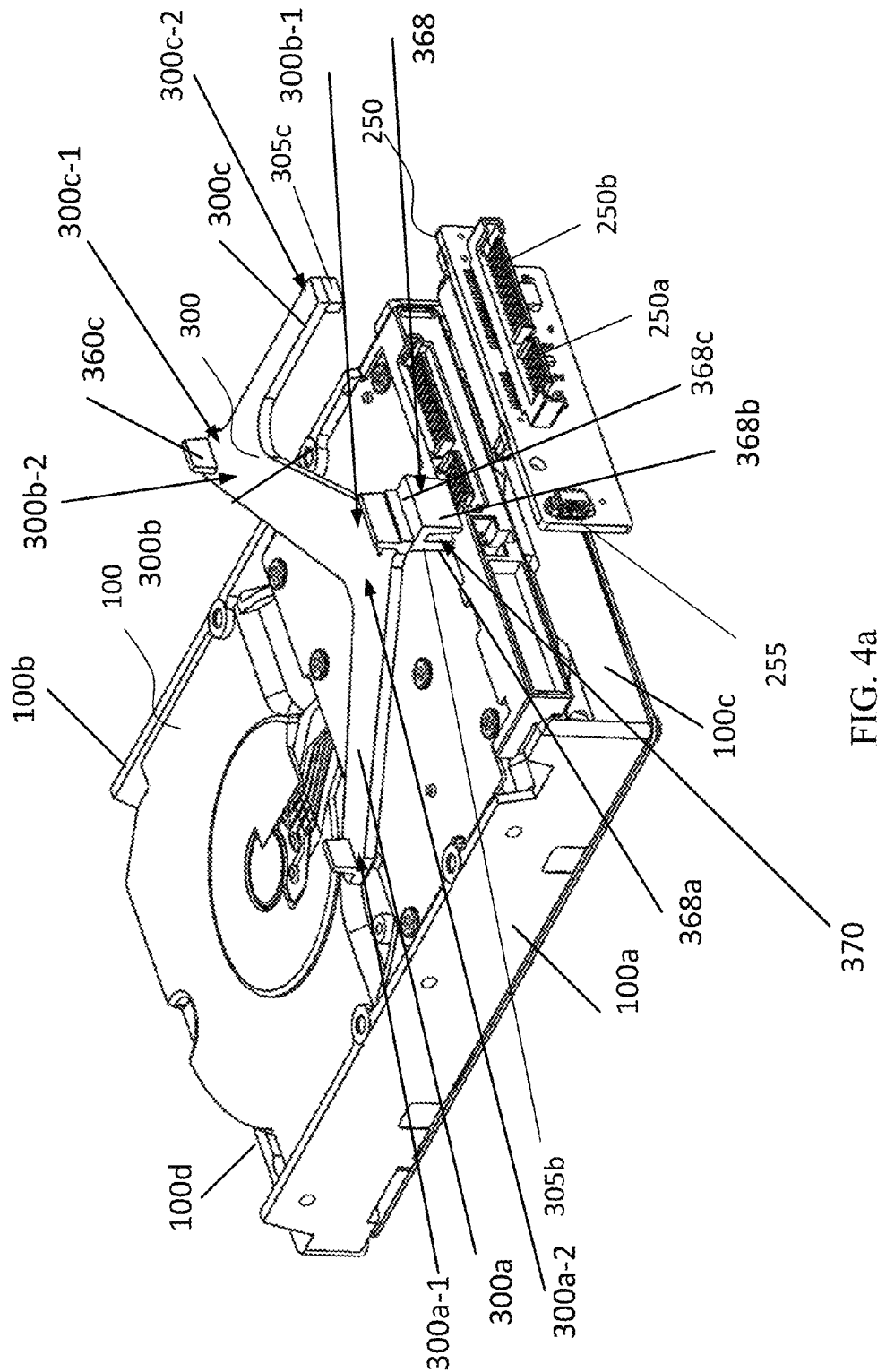
FIG. 4a shows a perspective view of the HDD, the retaining clip and the interposer in a disassembled configuration.
Figure 4B:
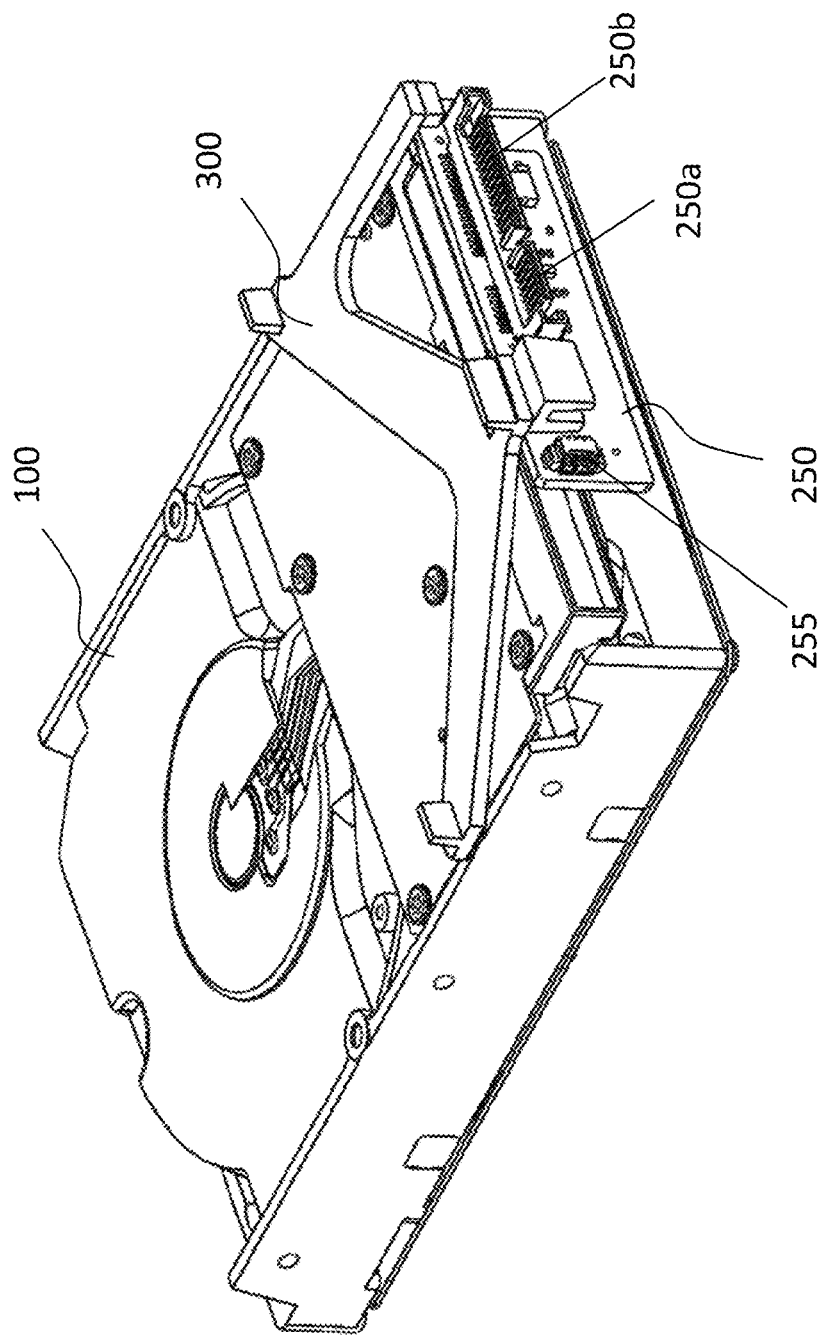
FIG. 4b shows the HDD, interposer and retaining clip of FIG. 4a in an assembled configuration.

FIG. 4a shows a perspective view of the HDD 100, the retaining clip 300 and the interposer 250 in a disassembled configuration. FIG. 4b shows the HDD, interposer and retaining clip of FIG. 4a in an assembled configuration. In the assembled configuration, the interposer may be inserted into the HDD's data and power connector and the retaining clip 300 engaged to secure the interposer 250 to the HDD 100 while still exposing the data and power connectors 250a and 250b.

Figure 4C:
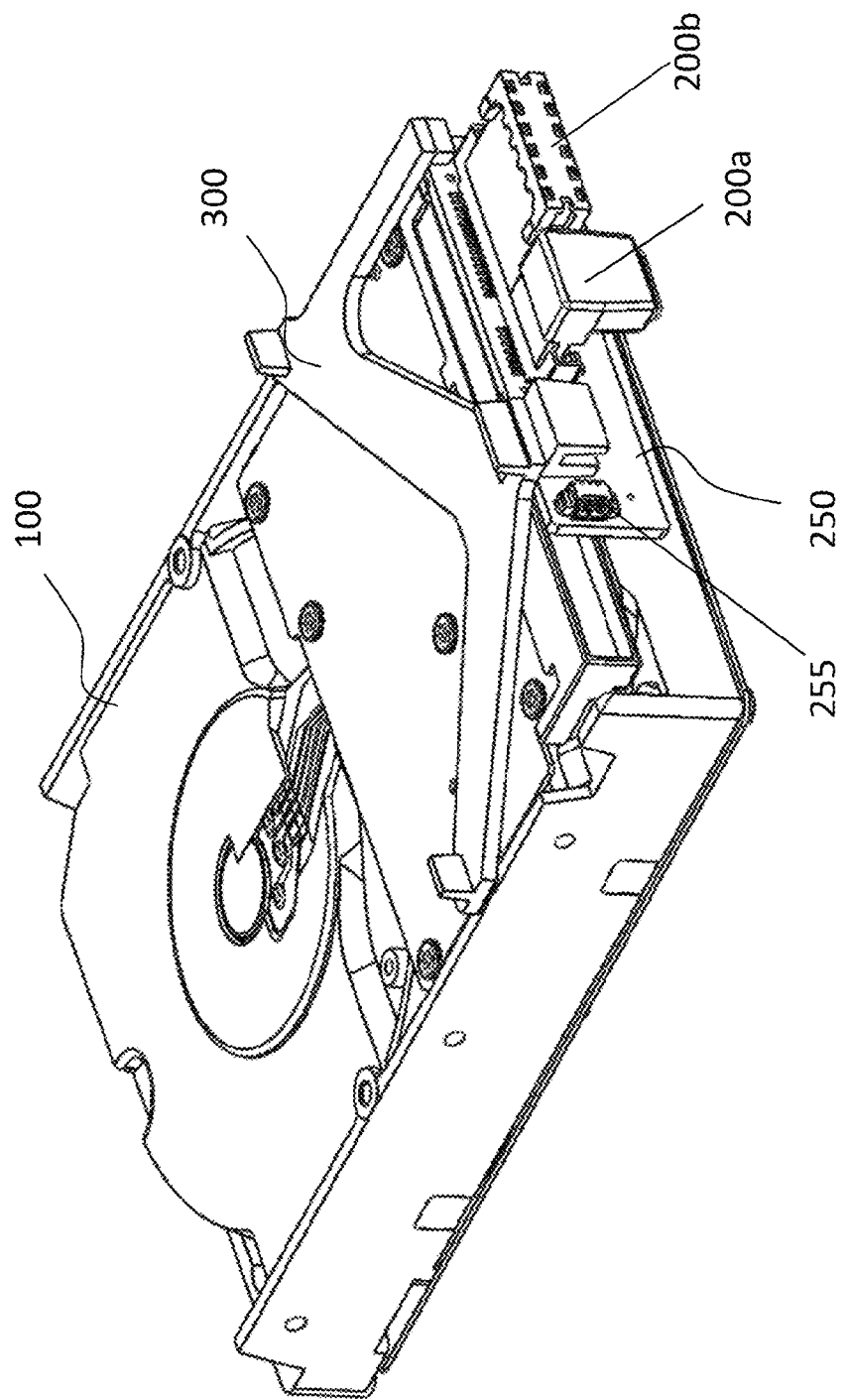
FIG. 4c shows the HDD, interposer, retaining clip and cable in the assembled state.

As shown, the planar body 305a of the retaining clip 300 may further include a second tab 305c configured to secure the interposer 250 at a second position against the HDD. FIG. 4c shows a fully assembled configuration with host data and power connectors 200a and 200b, engaged with the interposer 250. The first and second tabs 305b and 305c may be aligned in substantially the same plane and engage with the interposer 250.

Figure 5:
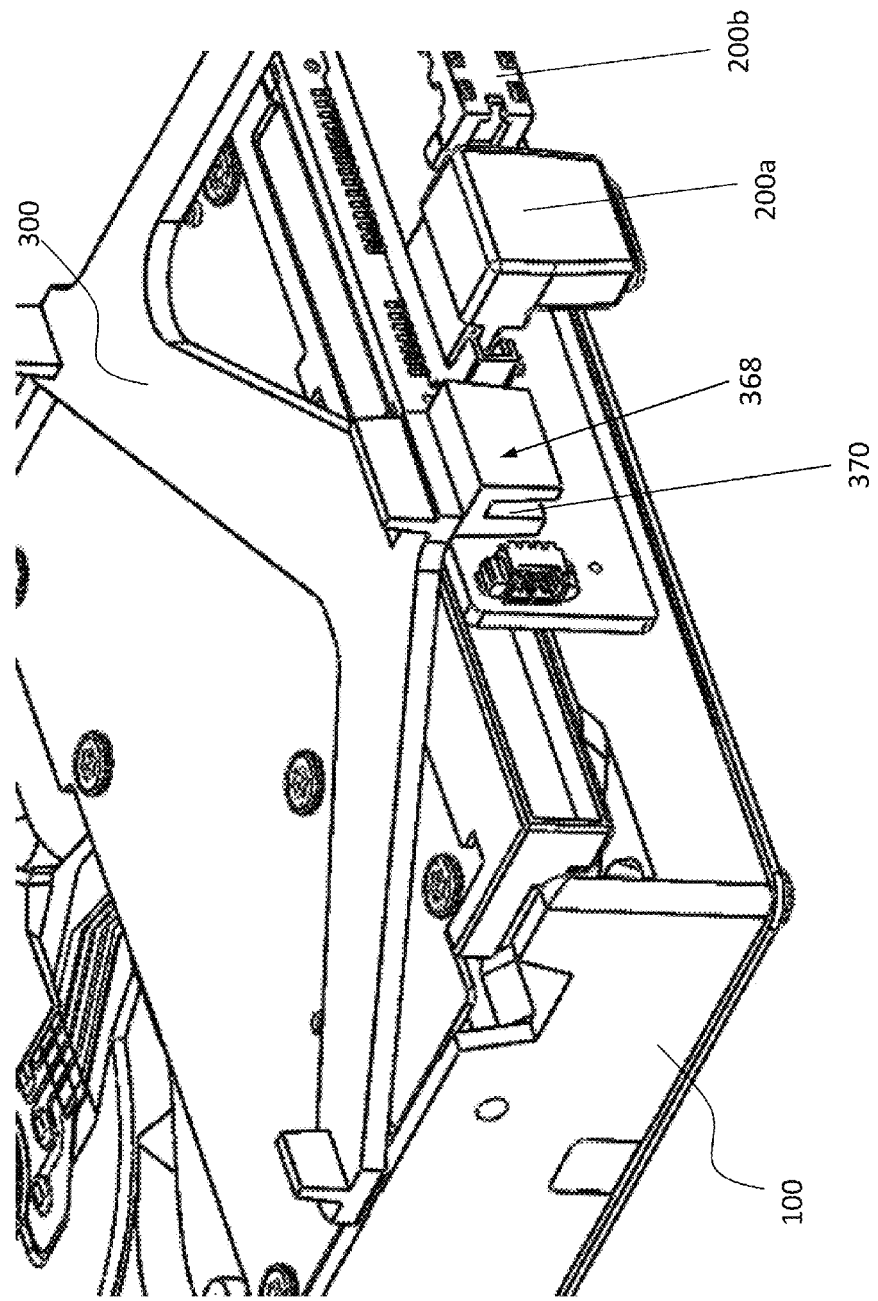
FIG. 5 shows a close-up of the notched tab of the retaining clip.

As shown in FIG. 5 and described in detail above, the retaining clip 300 may further include the notched tab 368 having a generally U-shaped configuration and configured as a guide channel 370 for a cable (not shown). The third cable may be a control and monitoring cable or kick starter cable insertable into the control and monitoring port 255 of the interposer. This type of cable can be used to control power to the HDD through dedicated logic on the interposer 250, for example for staggered spin up of individual drives in an array and monitoring of the I/O activity of each drive separately through status LEDs. The "notched" guide channel 370 configuration allows for routing of the control and monitoring cable towards the host data and power cables for consolidation and ease of management of all host interface cables.

Figure 6:
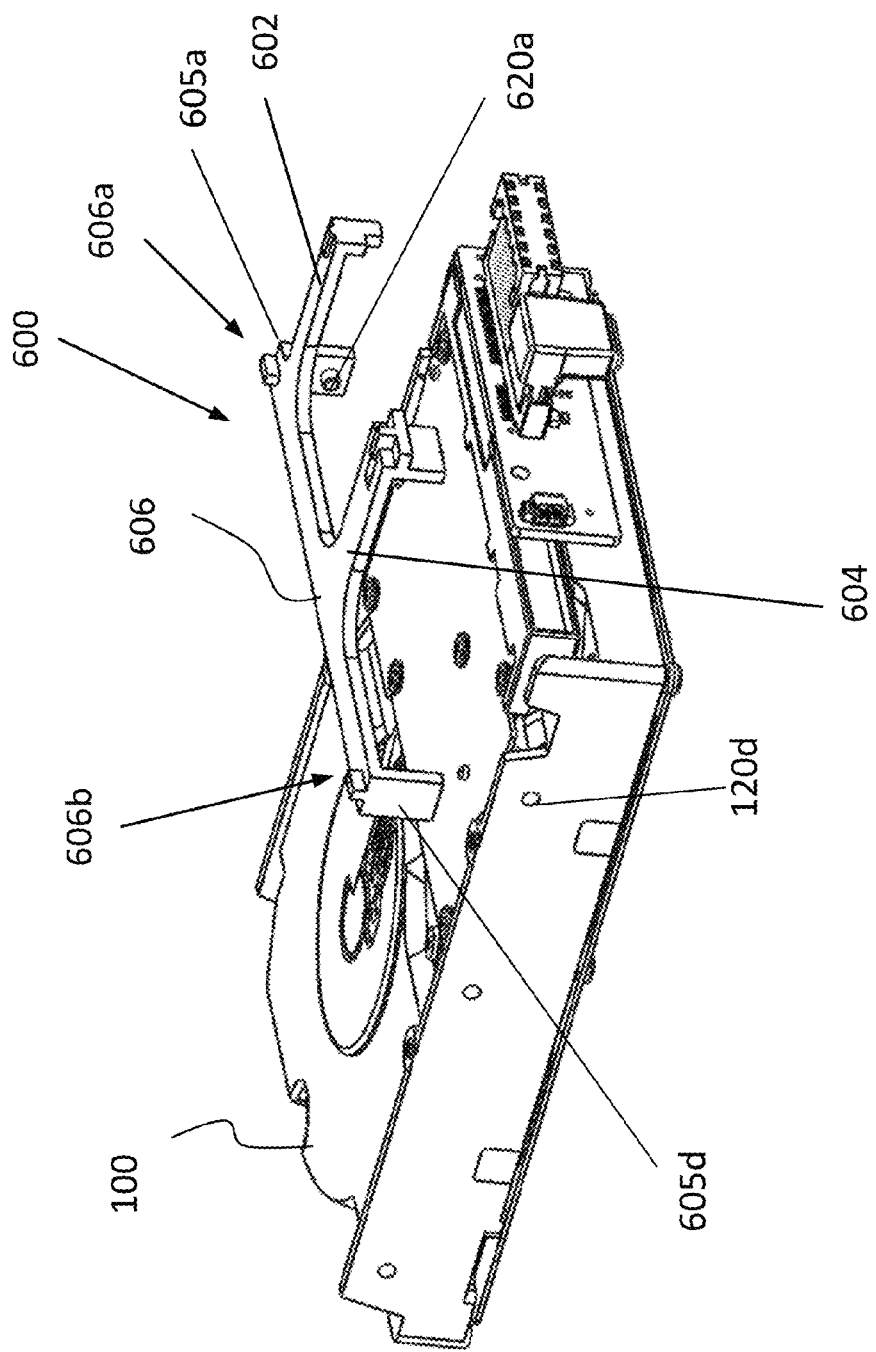
FIG. 6 shows a retaining clip with laterally positioned tabs and pegs

According to another aspect, as shown in FIG. 6, a retaining clip 600 may include a planar body 605a having a first arm 602 and a second arm 604 integrally connected to and extending perpendicularly outward from a base member 606 having a first end 606a and an opposing second end 606b. The first arm 602 may be connected to the first end 606a of the base member 606 while the second arm 604 may be connected approximately in the center of the base member 606.

The base member 606 may include a first lateral tab 605a extending perpendicularly downward from the first end 606a base member 606 and a second lateral tab 605d extending perpendicularly downward from the second end 606b. The first and second lateral tabs 605a and 605d extend from the planar body along the lateral sides of the drive and include pegs that are inserted into lateral mounting holes 120a, 120d of the drive enclosure. That is, the first and second lateral tabs 605a and 605d may be utilized to clamp around the lateral sides of a drive and include pins or pegs 620a, 620d that insert into the lateral mounting holes, for example mounting hole 120d (opposite from 120a). Depending on the enclosure and deployment environment, one or the other configuration may be preferable.

Method of Securing Interposer with a Mass Storage Device

According to another aspect, a method of securing an interposer 250 to a mass storage device using a retaining clip is provided. The interposer may act as a conduit for power and data transfer between a storage drive 100 and cables connected to a structure of a host system by using a retaining clip 300. As described previously, the interposer may include a carrier board, a first connector configured to mate with a signal and power connector assembly of the mass storage device and the second connector configured to mate with a cable assembly providing signals and power from a host computer.

The retaining clip 300 may include a planar body 305a, preferentially made from an electrically non-conducting material, which aligns in a substantially parallel manner with the bottom surface of a drive having mounting holes for the device and a peg protruding from the planar body, such that it can be inserted into one of mounting holes. When the peg is inserted into the mounting hole of the device, it defines a position of the planar body relative to the mass storage device. More specifically, the retaining clip 300 may include at least one peg, such as peg 310a or peg 310c, protruding from the planar body 305a in normal direction and configured to be inserted into a mounting hole 110 of the drive at its bottom surface. The retaining clip 300 may further include a first tab 305b extending perpendicularly from the planar body 305a at a right angle and positioned relative to the location of the peg (310a or peg 310c) to extend from the planar body 305a at a distance from the face of the drive, thereby allowing the retaining clip 300 to slide over the interposer 250 and securing the latter to the drive 100. The tab may include an optional peg 340 protruding in a substantially right angle and positioned to engage with a hole 240 in the interposer 250. That is, the tab may extend from the planar body in a substantially right angle such that it overlaps with the interposer, or, specifically, its carrier board. The proximal surface of the tab facing the mass storage device applies pressure on the interposer, holding it against the device.

The planar body 305a may further include a second tab 305c in addition to the first tab 305b where both the first and second tabs 305b and 305c are configured to engage with the interposer 250. In yet another aspect, the retaining clip 300 may engage with the drive through at least two pegs 310a, 310c, configured to be inserted into two mounting holes 110a, 110c, at the bottom of the drive. In yet another aspect, the planar body 305a of the retaining clip 305a may include two laterally positioned tabs positioned to wrap around the lateral sides of a drive, the tabs having protruding pegs to be inserted into mounting holes 120 of the drive. Both the first and second table may be substantially co-planar and configured to engage with the interposer. The tabs may have additional pegs to be inserted into holes in the interposer, thereby preventing the interposer from shifting or moving.

Additionally, the planar body may be secured against the device by having fins extending in substantially opposite direction from the pegs towards the system enclosure, thereby preventing the retaining clip from disengaging from the mass storage device.

In another aspect of the method, the first tab 305b may comprise a notch configured to serve as a guide channel for a third cable. The third cable may transfer control and monitoring signals, non-limiting examples of which include I/O activity monitoring or switching on or off the power to the drive for individual power gating of each drive. The notch allows for routing of the third cable from connector 255 to the SATA power and data cables and subsequent combined routing of all three through the chassis, thereby avoiding airflow obstruction and clutter within the chassis.

In another aspect of the method illustrated in FIG. 6, the interposer 250 may be secured to the drive 100 using a retaining clip 600 having a planar body and extending into lateral tabs 605a, 605d that clamp around the lateral sides of a drive and have pins or pegs 610a, 610d that insert into the lateral mounting holes, for example mounting hole 120d. That is, the retaining clip may be configured to include lateral tabs 620a, 620d extending from the planar body along the lateral sides of the drive and having pegs 610a, 610d that are inserted into lateral mounting holes 120a, 120d of the drive enclosure.

While the invention has been described in form of specific and preferred embodiments and form factors, it is foreseeable that functionally equivalent designs could be used or subsequently developed to perform the intended functions of the disclosed retaining clip. Therefore, it is apparent that other forms could be adopted by one skilled in the art. Finally, while the appended claims recite certain aspects believed to be associated with the invention and investigations discussed above, they do not necessarily serve as limitations to the scope of the invention.

The invention claimed is:

1. A retaining clip for securing an interposer to a first surface of a mass storage device with a mass storage device, comprising:
   a planar body in alignment with a second surface of the mass storage device, the second surface having a plurality of mounting holes for the device;
   a first peg protruding from the planar body, the first peg configured for insertion into a first mounting hole of the plurality of mounting holes, and defining a position of the planar body relative to the mass storage device; and
   a first tab extending perpendicularly downward from the planar body and configured to overlap with a carrier board of the interposer, where a proximal surface of the first tab apposing the device is located at a distance from the first surface of the device when the first peg is inserted into the first mounting hole.

2. The retaining clip of claim 1, wherein the retaining clip further comprises a second peg extending perpendicularly downward from the planar body and configured for insertion into a second mounting hole of the plurality of mounting holes.

3. The retaining clip of claim 2, wherein the retaining clip further comprises a second tab located in the same plane as the first tab.

4. The retaining clip of claim 2, wherein the planar body includes:
   a first member including a first end and an opposing second end;
   a second member including a third end and a fourth end, wherein the third end of the second member is integrally connected to the second end of the first member; and
   a third member including a fifth end and an opposing sixth end, wherein the fifth end of the third member is integrally connected to the fourth end of the second member, and wherein the third member located in a same vertical plane as a side edge of the mass storage device; and
   wherein the second peg extends perpendicularly downward from where the second end of the first member integrally connects with the third end of the second member.

5. The retaining clip of claim 2, wherein the retaining clip further comprises a first fin extending perpendicularly upward from the first end of the first member in an opposite direction of the first peg.

6. The retaining clip of claim 5, wherein the retaining clip further comprises:
   a second fin extending perpendicularly upward from where the second end of the first member and the third end of the second member integrally connect, in the substantially opposite direction of the first tab; and a third fin extending perpendicularly upward from where the fourth end of the second member and the fifth end of the third member integrally connect in the substantially opposite direction of the first tab.

7. The retaining clip of claim 6, wherein the first, second and third fins appose a structure of a host system connected to the mass storage device and press down on the retaining clip against the mass storage device preventing the first and second pegs from disengaging from the first and second mounting holes.

8. The retaining clip of claim 1, wherein the first tab includes a notch member having a U-shape and comprising a first wall and a second wall separated by an upper wall forming a channel adapted to receive a cable.

9. The retaining clip of claim 8, wherein the first tab includes a tab peg, extending perpendicularly outward from a first wall and parallel to the planar body, for insertion into an interposer mounting hole located on a back surface of the interposer.

10. The retaining clip of claim 1, wherein the planar body comprises a base member having a first base end and an opposing second base end, a first arm integrally connected to and extending perpendicularly outward from the base member, and a second arm integrally connected to and extending perpendicularly out from a center portion of the base member.

11. The retaining clip of claim 10, wherein the base member includes a first lateral tab extending perpendicularly downward from the first base end of the base member and a second lateral tab extending perpendicularly downward from the second base end of the base member.

12. The retaining clip of claim 11, wherein the first and second lateral tabs include pegs extending perpendicularly outward and adapted to be received into the plurality of mounting holes.

13. An apparatus comprising:
a mass storage device with a host interface connector and a first cable to connect the host interface connector of the mass storage device to a structure of a host system;
an interposer inserted between the mass storage device and the first cable, the interposer including:
a carrier board including a distal surface of the carrier board positioned at a distance from a first surface of the mass storage device; and
a first connector to connect with the host interface connector of the mass storage device and a second connector to connect with the first cable;
a retaining clip for securing the interposer to the mass storage device, the retaining clip including:
a planar body in alignment with a second surface of the mass storage device, the second surface having a plurality of mounting holes for the device;
a first peg protruding from the planar body, the first peg configured for insertion into a first mounting hole of the plurality of mounting holes, and defining a position of the planar body relative to the mass storage device; and
a first tab extending perpendicularly downward from the planar body and configured to overlap with the carrier board of the interposer, where a proximal surface of the first tab apposing the device is located at a distance from the first surface of the device when the first peg is inserted into the first mounting hole.

14. The apparatus of claim 13, wherein the retaining clip further includes a second peg extending perpendicularly downward from the planar body and configured for insertion into a second mounting hole of the plurality of mounting holes.

15. The apparatus of claim 14, wherein the planar body includes:
a first member including a first end and an opposing second end;
a second member including a third end and a fourth end, wherein the third end of the second member is integrally connected to the second end of the first member; and
a third member including a fifth end and an opposing sixth end, wherein the fifth end of the third member is integrally connected to the fourth end of the second member, and wherein the third member located in a same vertical plane as a side edge of the mass storage device; and
wherein the second peg extends perpendicularly downward from where the second end of the first member integrally connects with the third end of the second member.

16. The apparatus of claim 15, wherein the retaining clip further comprises a first fin extending perpendicularly upward from the first end of the first member in an opposite direction of the first peg.

17. The apparatus of claim 16, wherein the retaining clip further comprises:
a second fin extending perpendicularly upward from where the second end of the first member and the third end of the second member integrally connect, in the substantially opposite direction of the first tab; and
a third fin extending perpendicularly upward from where the fourth end of the second member and the fifth end of the third member integrally connect in the substantially opposite direction of the first tab.

18. The apparatus of claim 17, wherein the first, second and third fins appose a structure of a host system connected to the mass storage device and press down on the retaining clip against the mass storage device preventing the first and second pegs from disengaging from the first and second mounting holes.

19. The apparatus of claim 13, wherein the planar body comprises a base member having a first base end and an opposing second base end, a first arm integrally connected to and extending perpendicularly outward from the base member, and a second arm integrally connected to and extending perpendicularly out from a center portion of the base member; and wherein the base member includes a first lateral tab extending perpendicularly downward from the first base end of the base member and a second lateral tab extending perpendicularly downward from the second base end of the base member.

20. A method for securing an interposer assembly with a mass storage device, the interposer including a carrier board, a first connector configured to mate with a signal and power connector assembly of the mass storage device and the second connector configured to mate with a cable assembly providing signals and power from a host computer, the method comprising:
mating the interposer with the device,
attaching a retaining clip to the device and interposer, the retaining clip including:
a planar body in alignment with a second surface of the mass storage device, the second surface having a plurality of mounting holes for the device;
a first peg protruding from the planar body, the first peg configured to be inserted into a first mounting hole of the plurality of mounting holes, and defining a position of the planar body relative to the mass storage device; and
a first tab extending perpendicularly downward from the planar body and configured to overlap with the carrier board of the interposer, where a proximal surface of the first tab apposing the device is located at a distance from the first surface of the device when the first peg is inserted into the first mounting hole.

* * * * *